United States Patent [19]

Pavan et al.

[11] 4,441,164

[45] Apr. 3, 1984

[54] ELECTRONIC TELEPRINTING APPARATUS INCLUDING A REMOVABLE PROGRAMMED EPROM

[75] Inventors: Gianni Pavan; Mario Lorenzi, both of Ivrea, Italy

[73] Assignee: Ing. C. Olivetti & C., S.p.A., Ivrea, Italy

[21] Appl. No.: 279,580

[22] Filed: Jul. 1, 1981

[30] Foreign Application Priority Data

Jul. 3, 1980 [IT] Italy ............... 68050 A/80

[51] Int. Cl.³ ............................. G06F 15/16
[52] U.S. Cl. ...................... 364/900; 365/94; 364/200
[58] Field of Search .............. 364/900, 300, 200; 365/94, 189

[56] References Cited

U.S. PATENT DOCUMENTS

| | | | |
|---|---|---|---|
| 3,753,246 | 8/1973 | Kiffmeyer et al. | 364/900 |
| 3,798,612 | 3/1974 | Struger et al. | 364/900 |
| 3,944,984 | 3/1976 | Morley et al. | 364/900 |
| 4,093,998 | 6/1978 | Miller | 364/900 |
| 4,128,900 | 12/1978 | Lappington | 365/94 |
| 4,156,926 | 5/1979 | Hartman | 364/900 |

OTHER PUBLICATIONS

Uimari, PROM's, Electronic Products, Jan. 21, 1974, p. 75, (87).

Primary Examiner—Jerry Smith
Assistant Examiner—Jameson Lee
Attorney, Agent, or Firm—Banner, Birch, McKie & Beckett

[57] ABSTRACT

A data processing apparatus is provided with a keyboard and a programmable read-only memory, for example of EPROM type, for durably preserving data which define the manner of operation of the apparatus. A programming circuit connected to the apparatus allows a new memory of the same type to be programmed either by automatic recording of data contained in the original EPROM memory, or by data entered by means of the keyboard in order to make available a new read-only memory provided with data modified relative to the data of the original memory.

10 Claims, 8 Drawing Figures

ELECTRONIC TELEPRINTING APPARATUS INCLUDING A REMOVABLE PROGRAMMED EPROM

BACKGROUND OF THE INVENTION

The invention relates to a data processing apparatus with a programmable read-only memory, a central processor, and a keyboard for entering commands or data, in which the memory is arranged to contain data necessary for the operation of the apparatus.

Memories known by the name of PROM (programmable ROM) or EPROM (erasable programmable ROM) are read-only memories, and are programmed in order to durably preserve general data necessary for initializing the machine or for controlling its subsequent operation. PROM and EPROM memories are programmable one or more times respectively, by means of an electrical apparatus.

The advantage of using read-only memories of PROM and EPROM types lies in the facility for programming or updating the permanent data required by the apparatus. The need to update permanent data, which is important in any data processing system, is particularly felt in the case of electronic teleprinters, because such permanent data can determine the method of message communication, the automatic response, the line timing and other variable parameters, according to the local situation in which the machine is used. It is known to update such data by means of a suitable device separate from the apparatus in which the PROM or EPROM memory is used.

The object of the invention is to make updating of the data stored in PROM or EPROM memories more rapid and reliable, and to make the checking thereof more reliable.

SUMMARY OF THE INVENTION

The data processing apparatus according to the invention comprises a programming circuit which is integrated into the apparatus and is arranged for control by the central processor, the programming circuit being adapted, in a selected condition of the apparatus, to effect programming of a read-only memory in response to data entered from the keyboard.

BRIEF DESCRIPTION OF THE DRAWINGS

A preferred embodiment is described hereinafter with reference to the accompanying drawings in which:

FIG. 4 (FIGS. 4A and B assembled) is a flow chart of the successive programming operations;

FIG. 6 is a flow chart of the complete printing operations of the EPROM memory.

DESCRIPTION OF THE PREFERRED EMBODIMENT

The data processing apparatus 13 (FIG. 1) is constituted by a central processor 1 connected by a bus 2 to an ROM (read only memory) 3, to an RAM (random access memory) 4, to an EPROM permanent memory 5 and to a printer 12.

Figure 1:
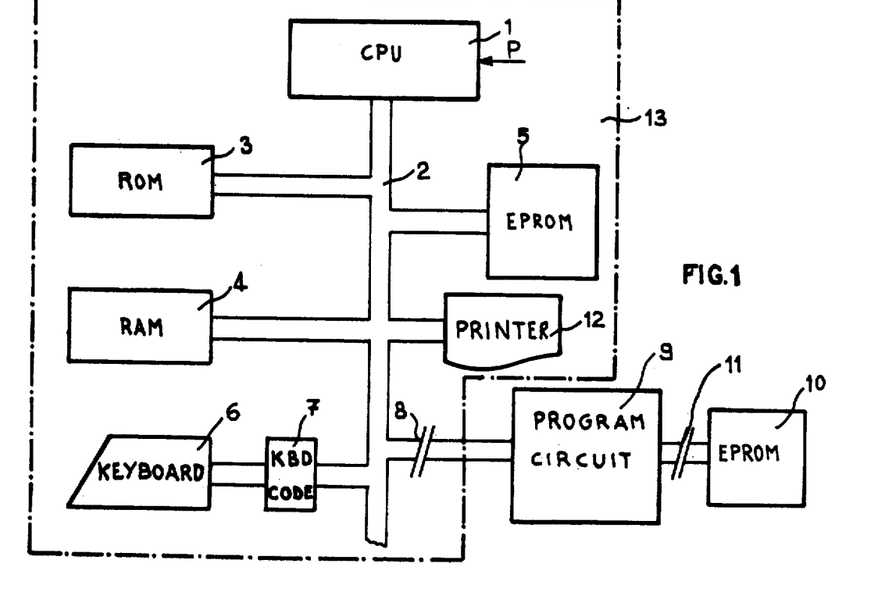
FIG. 1 is a general block diagram of a data processing apparatus embodying the invention.

A keyboard 6 generates decoded commands and data over the bus by means of a keyboard coder 7. A programming circuit 9 is connected to the apparatus 13 by means of a connector 8 in order to programme a new EPROM 10 connected thereto by means of a connector 11. The apparatus 13 may be an electronic teleprinter station of the type described in the U.S. Pat. application, Ser. No. 273,615, entitled "Message transmission, reception and processing apparatus" assigned to the same assignee of this application. In particular, the EPROM 5 corresponds to the EPROM 23 of said patent application, and is arranged to contain operating routine data as well as identification data including at least teleprinting answer back data, the data relative to the characteristics of the teleprinting connection and line, the data necessary for decoding particular sequencies of characters, and the editing data for message printing. Some of these data are used by the operating system for initialising the teleprinter on switching-on, in known manner.

It is well known that EPROMs can be programmed, after erasing with ultraviolet rays, by recording at high voltage relative to the normal reading and writing voltage of the apparatus, so that it is apparent that EPROMs can be permanently programmed when under such predetermined erasing and feed voltage conditions.

The programming circuit 9 is assembled on a board 20 (FIG. 2) of the teleprinter 13, whereas the new EPROM memory 10 is mounted on a board 21. The connector 11 (PCB edge connector) allows direct connection between the boards 20 and 21. When this connection is made, a contact 30 closes to inform the CPU 1 over a line P that the connection has taken place. The connector 8 is arranged to connect the board 20 to the bus 2 of the teleprinter 13 by means of a multiple cable.

Figure 2:
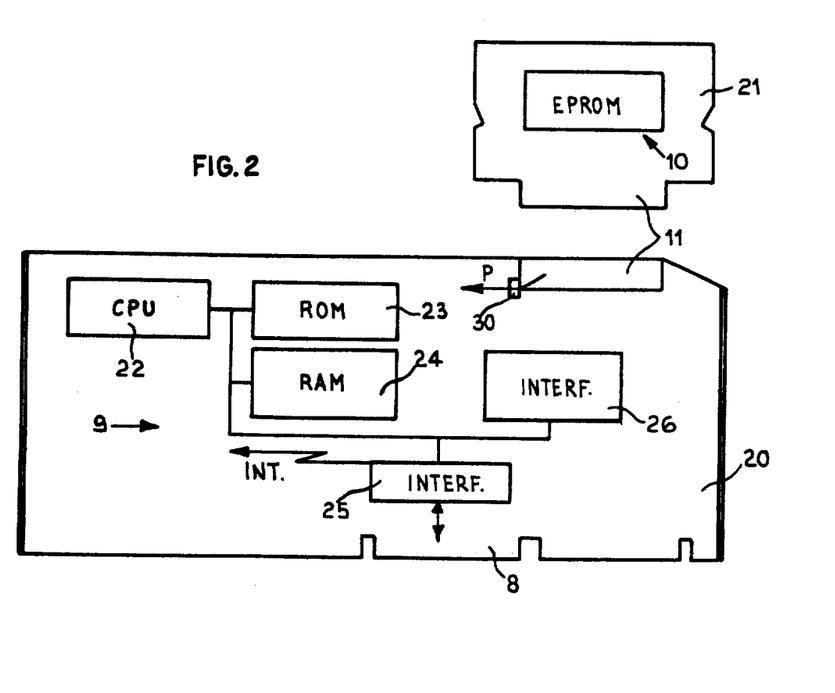
FIG. 2 shows the physical arrangement of the components and connections of a programming circuit 9.

The programming circuit 9 comprises essentially a second processor 22, an ROM 23 arranged to contain the operating microprogrammes for the circuit 9, and an RAM working memory 24 for temporarily storing the data contained in the memories 5, 10. The programming circuit also comprises a transfer interface 25, by means of which the processor 22 converses with the central processor 1, and a recording interface 26 by means of which access is gained to the EPROM 10.

The interface 25 allows transfer of one code at a time representative of a command or character destined for the main processor 1 or for the secondary processor 22. Each time the main processor 1 generates a code destined for the second processor 22, the interface 25 stores it and activates an interrupt signal INT which conditions the processor 22 in known manner for accepting the code in order to effect the appropriate operations.

The interface 25 (FIG. 3) by means of which conversation is carried on between the secondary processor 22 and main processor 1 is analogous to the interface 50 described in the aforesaid patent application and disposed between the central units 20 and 52 of the basic machine 1 and additional machine 4 of that application respectively. Only the essential principles of operation are summarised hereinafter.

Figure 3:
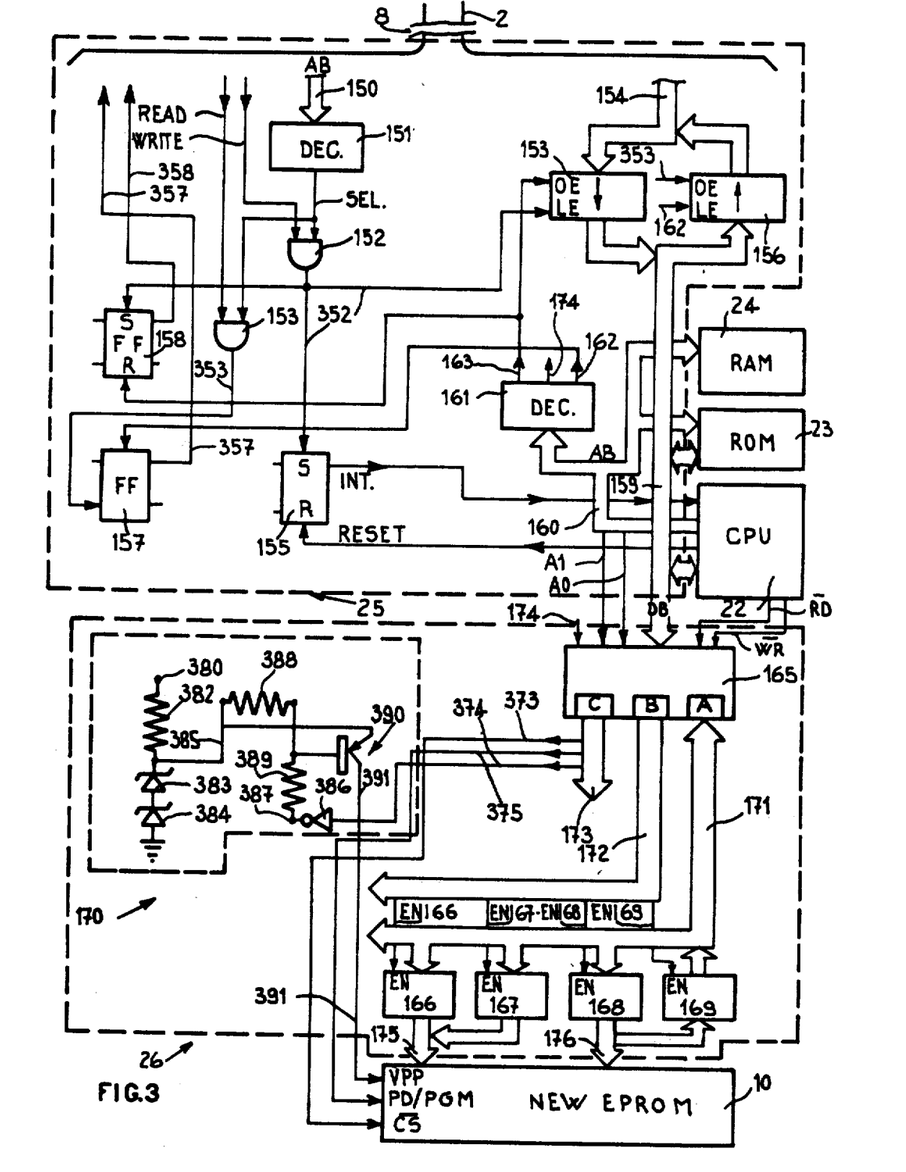
FIG. 3 is a diagram of the electrical programming circuit.

The CPU 1 converses with the interface 25 by way of the bus 2 which comprises a data bus 154, an address bus 150 and some READ and WRITE command lines 357, 358. The processor 1 generates at its output signals READ or WRITE signals and a code over the address bus 150. The combination of the signals and code interpreted by a decoding circuit 151 and by two logic gates 152 and 153 represents a reading or writing selection for the secondary processor 22. In the case of a writing selection, a register 153 is enabled to store a code fed by the processor 1 over the data bus 154, and simultaneously a flip flop 155 is set to generate the interrupt signal INT at the input to the secondary processor 22. It is apparent that the register 153 can store the data fed into the processor from the keyboard 6 or from the EPROM 5.

In contrast, a reading selection has the effect of enabling a register 156 by means of a signal 353, in order to generate over the data bus 154 a code contained therein and fed by the processor 22. The outputs 357 of a flip flop 157 and 358 of a flip flop 158 are examined periodically by the central processor 1, and, if active, indicate the fact that the register 156 or register 153 respectively contain codes ready for transfer.

A DB data bus 159 connects the two registers 153 and 156 to the processor 22, for code transfer in either direction. In addition, the processor 22 generates by way of an AB address bus 160, two different command words for running the interface 25. These command words are decoded by a decoding circuit 161 in order to generate two types of control signal 162 and 163 respectively. The signal 162 enables the register 156 in order to store the code generated by the processor 22 over the data bus 159, and simultaneously activates the flip flop 157 for the explained function. The signal 163, activated by the processor 22 on each interruption signal INT, enables the register 153 in order to generate over channel 159 the code stored therein, and resets the flip flop 158 to indicate that reading has taken place. The flip flop 155 which has set the signal INT is reset by the processor 22 by means of a reset signal.

The recording interface 26 essentially comprises a programmable input-output circuit 165 of INTEL 8255 type, which receives commands and data from the secondary processor 22. The input-output circuit 165 in its turn coordinates the generation of data, addresses and commands destined for programming the EPROM memory 10. Four registers 166, 167, 168 and 169 are included in the circuit 26 together with a voltage boosting circuit 170 for generating voltage of about 25 V necessary for programming the memory 10.

Various modes of operation of the input-output circuit 165 are described in the appropriate manuals published by INTEL Corporation. In the present embodiment the operation chosen is the so-called "O" type.

The data bus 159 of the processor 22 is used for exchanging commands, addresses and data with the circuit 165. The circuit 165 is connected to three buses 171, 172 and 173 corresponding to three input-output gates A, B and C included in the circuit 165. The three gates A, B and C are enabled selectively by a pair of signals A0 and A1 originating from the address bus 160 of the processor 22 to store the various types of data transferred between the processor 22 and the registers 166-169. Two RD and WR signals generated by the processor 22 in known manner select the direction of transfer.

The circuit 165 is also enabled by a general enabling signal 174 produced by the processor 22 by means of a suitable command word interpreted by the decoding circuit 161.

The bus 171 is used for transferring addresses or data to the registers 166, 167, 168. The bus 172 is used for communicating enabling commands for the registers 166-169, and the bus 173 for generating suitable enabling signals 373, 374 and 375 for the memory 10 and for the voltage boosting circuit 170.

The voltage boosting circuit 170 receives a feed voltage of 38 V which is present in a terminal 380, and is divided by a resistor 382 and a pair of Zener diodes 383 and 384 in order to supply over a line 385 a stable voltage of 25 V suitable for programming the EPROM memory 10 chosen in the present embodiment.

When the signal 374 goes to high lock level, the output 387 of an inverter 386 biases a transistor 389 by way of two resistors 388 and 389. The transistor 390, which now conducts, passes the voltage of 25 V over a line 391 representing the input to the VPP programming pin of the memory 10, so putting this latter in the condition required for programming.

Figures 4A, 6:
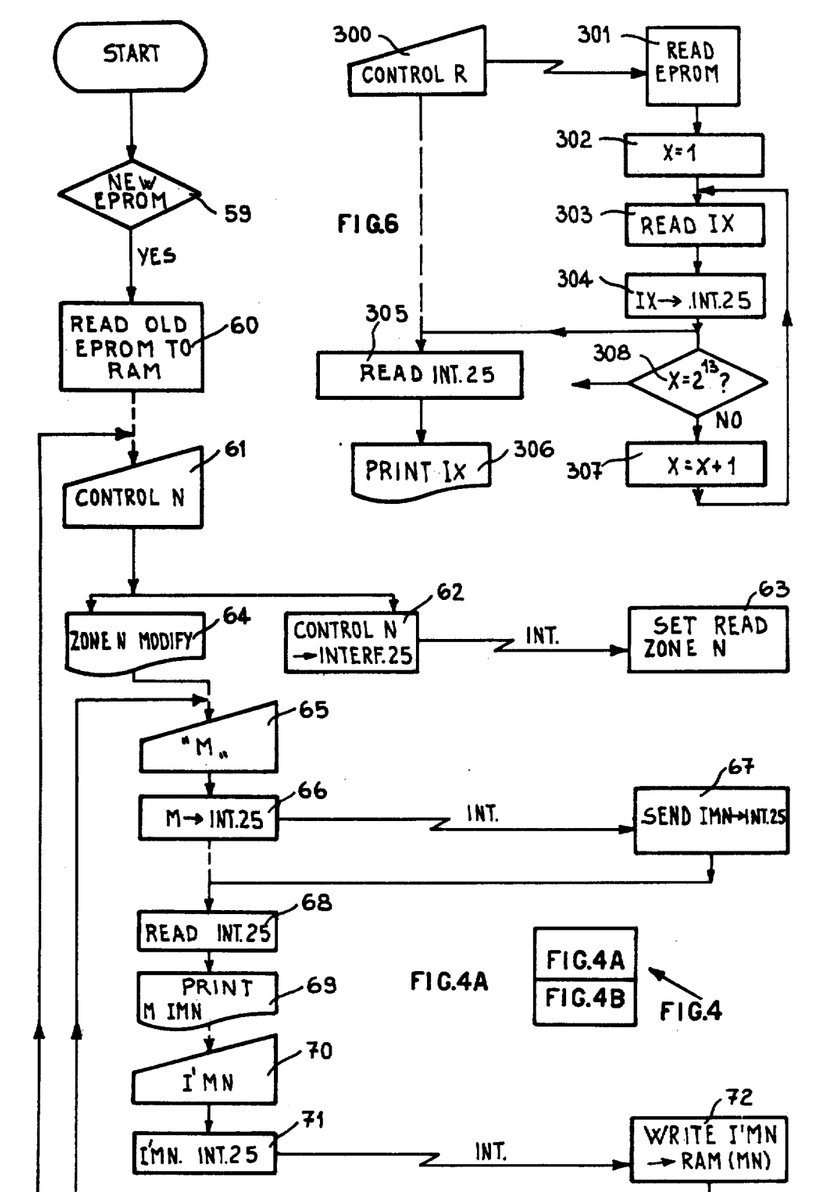
Figure 4B:
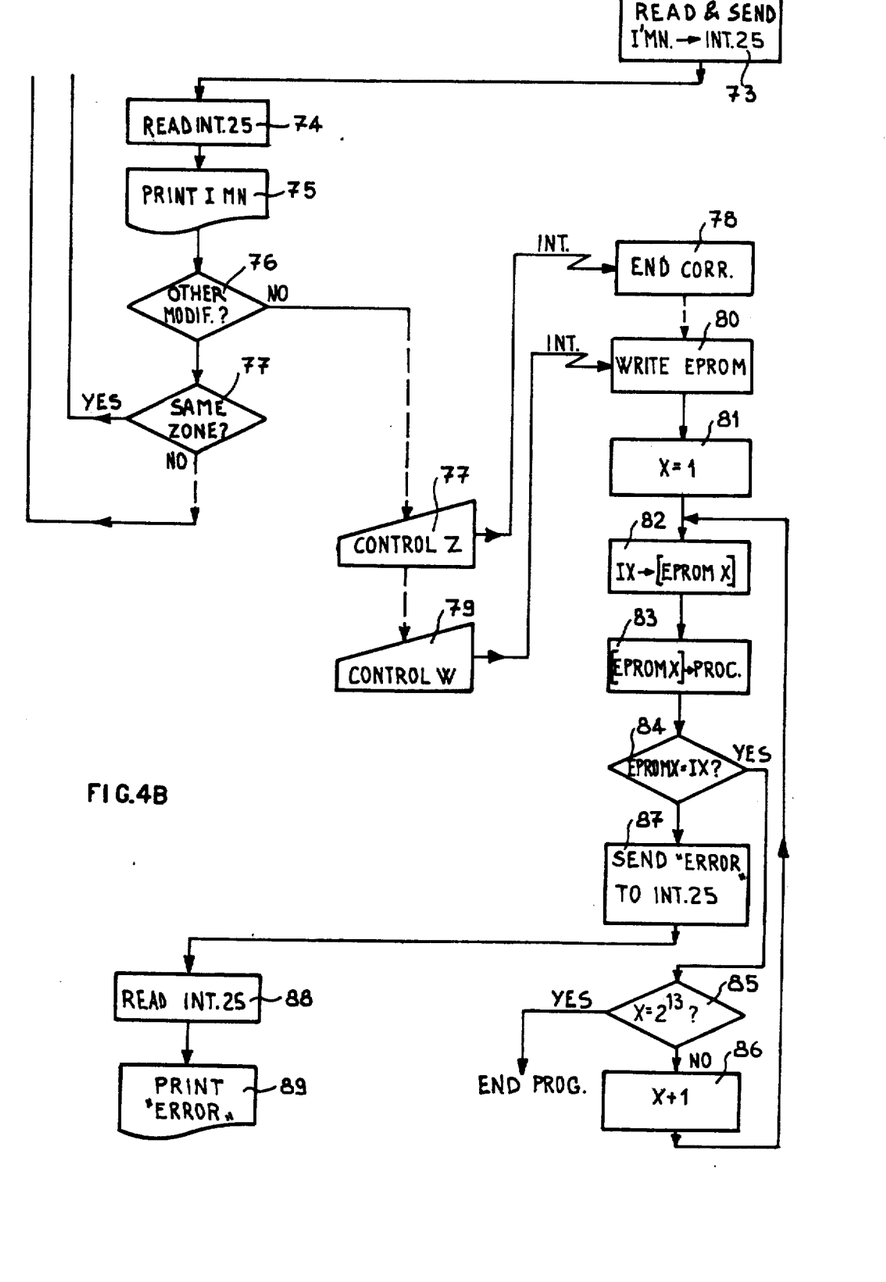
Figure 5:
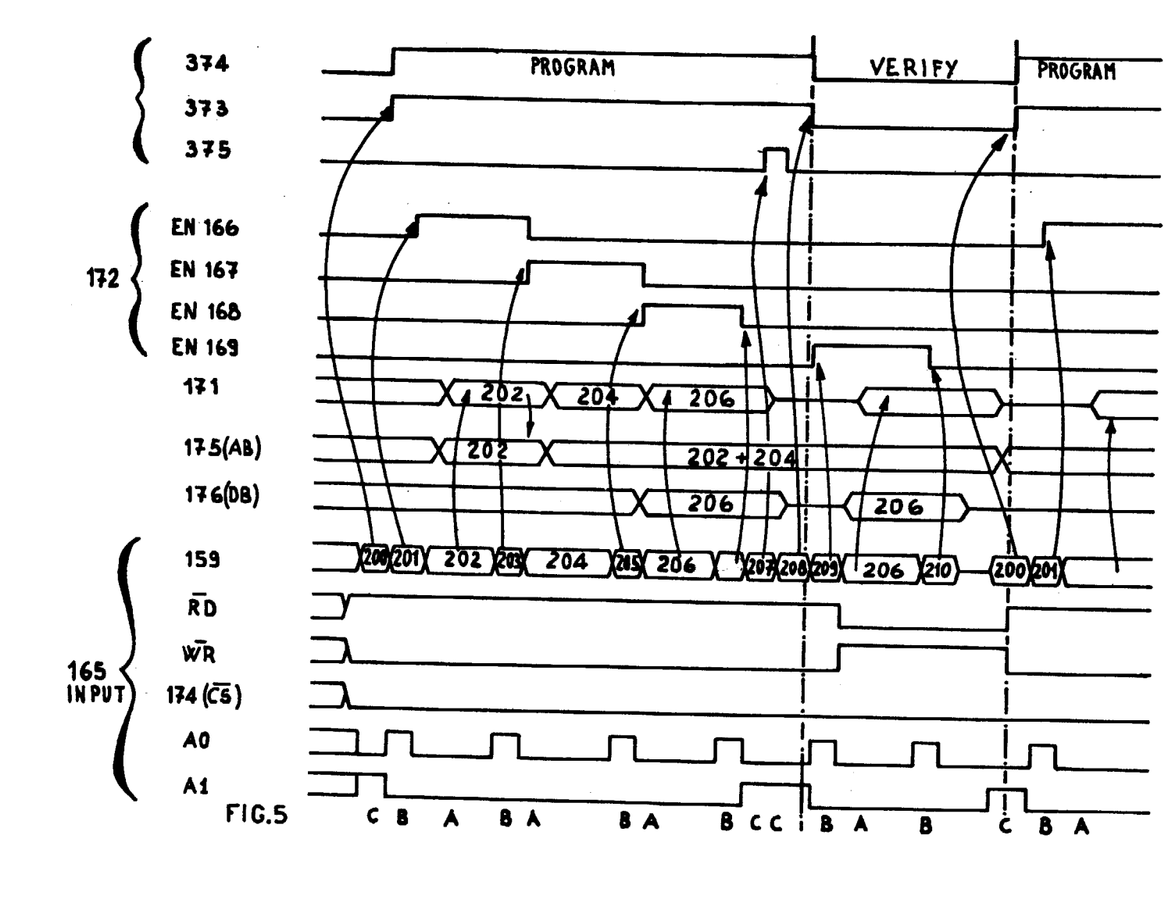
FIG. 5 shows the timing of the main electrical programming signals of the memory.

The operation of the apparatus for programming a new EPROM 10 is described hereinafter with reference to FIGS. 3, 4 and 5. Normally, the programming circuit 9 has no board 21 connected thereto. When the operator needs to programme a new EPROM 10, for example in order to connect the machine to a different telecommunication network, to change the answerback code sent in automatic response for any reason, or for reason of other standard transmission or editing instructions, he has generally to replace certain data of the EPROM 5 with new data, or at least add the new data to the data of the EPROM 5. The operator sets up the new data on the keyboard, while the data to remain unchanged are transferred to the new EPROM 10 from the existing EPROM 5.

The operator firstly connected the EPROM 10, plugged in a socket on the board 21, to the connector 11 of the board 20 of the programming circuit 9. The operator then switches on the machine, represented by START (FIG. 4), after which normal diagnosis operations are carried out followed by a check 59 for the presence of the board 21, which is indicated by a signal originating from the contact 30 (FIG. 2) over the line P. If the result of the check is positive, a routine 60 is run (FIG. 4a) in which, under the control of the CPU1, the EPROM 5 is read character by character by way of the interface 25 (FIG. 3), and is transferred into the RAM 24 of the circuit 9 under the control of the CPU, in a manner analogous to the transfers described in the aforesaid patent application.

It is apparent that at this point the working memory 24 is programmed exactly as the EPROM memory 5, so that each access to the memory 24 identifies the same data contained in the corresponding EPROM address, and the operations necessary for modifying the data are then executed on the memory 24. In order to carry out this modification, the operator executes operation 61 which consists of entering the word "CONTROL" on the keyboard 6 followed by a number indicated generally by "N", which indicates the zone N of the EPROM memory which it is required to modify.

The presence of codes relative to the word "CONTROL" at the output of the keyboard decoder 7 (FIG. 1) generally conditions the central processor 1 to feed commands or data to the programming circuit 9. In particular, the code "CONTROL N" composed by the operation 61 conditions the main processor 1 to execute two operations 62 and 64. By means of the operation 62 the command "CONTROL N" is stored in the interface 25, and the secondary processor 22, being interrupted, is set (block 63) for reading in the zone N of the working memory 24. By means of the operation 64, the main processor 1 causes the printer 12 (FIG. 1) to print the wording: "ZONE N PRESENT MODIFY".

The printer 12 receives the various codes indicative of commands or characters to be printed from the processor 1 over the channel 2. The circuits for decoding the codes received for controlling the various printing operations are located on the printer 12, and are of known type. The operator then introduces from the keyboard 6 a second number "M" (operation 65 in FIG. 3) which defines within the zone N the $M^{th}$ data item which it is required to modify and which will be indicated briefly as IMN.

The values M and N can clearly represent overall either the address of the prechosen data item directly, or a symbolic address, which is transformed by the processor 22 by conventional methods into an effective address, without for this reason changing the concepts herein described.

The response to feeding the number M to the processor 22 (FIG. 2) is now the reading of the data item IMN from the memory 24 and its storing 67 (FIG. 4) in the interface 25. The central processor 1 then accepts the data item IMN (block 68) to control a second printing operation 69. In particular, the printer 12 is now controlled in the described manner in order to print the data item IMN with the relative position number M in the following arrangement with respect to the preceding writing:

| ZONE N | PRESENT | MODIFY |
|--------|---------|--------|
| M      | IMN     |        |

By means of the keyboard 6, the operator now sets the required modifications (operation 70) or the new I'MN characters to replace those of the original IMN data items which has just been printed.

Summarising, the special cooperation, controlled by the processors 1 and 22, between the programming circuit 9, the keyboard 6 and printer 12 aids the operator in the following ways:

(1) By clearly printing the alphanumerical characters originally recorded on the EPROM memory 5 in the form of codes. This is possible because the printer 12 itself of the processing system 13 is used, and which by its nature is arranged to recognise the codes in use.

(2) By making it possible to feed-in directly the characters constituting the new data item I'MN by means of the keyboard 6, because the keyboard coder 7 generates the corresponding codes over channel 2, suitable for treatment by the various devices of the processing system 13 and of the programming circuit 9.

(3) By clearly printing the new characters fed in.

The operations described under points (2) and (3) are described in detail hereinafter.

The new data item I'MN is store (operation 71) in the interface 25. The interrup INT which follows this, conditions the secondary processor 22 to store (block 72) the new data item I'MN at the address MN of the working memory 24, in place of the original data item IMN. After this, the processor 22 reads the data item I'MN which has just been stored, and records it in the interface 25 (operation 73), from which it will be read (operation 74) and printed under the control of the central processor 1 (operation 75).

The printing of the new data item I'MN completes the previously printed writing in the following manner:

| ZONE N | PRESENT | MODIFY |
|--------|---------|--------|
| N      | IMN     | I'MN   |

In this manner, the operator checks the address MN of the modified information item, the original information item IMN and the newly introduced data item I'MN. The fact that the data item I'MN is printed (operation 75) after it has been read (operation 73) from the working memory 24 rather than at the time of its introduction (operation 70) assures the operator that it has been correctly recorded in the memory 24.

If the result of a selection 76 is positive, this indicates that the operator wishes to modify further data. In this case, the procedure follows one of two paths, by virtue of the selection 77, according to whether the modification still relates to the zone N of the memory 22 previously selected or another zone. In the first case, the operations restart from the block 65, which indicates the selection of the $M^{th}$ data item within the zone N, but clearly with a value of M which is different from the preceding. In the second case however, the operations restart from the block 61 with which a number N is selected indicative of a zone different from that previously concerned.

When all modifications have been made (negative outcome of the selection 76), the operator again enters the command "CONTROL" for the programming circuit 9, followed by the letter "Z", to indicate to the processor 22 (blocks 77-78) the end of introduction of the data items I'MN. Finally, by the operation 79, the operator enters a command "CONTROL W" which is interpreted by the secondary processor 22 as a programming command for the new EPROM memory 10 (block 80).

Programming of the EPROM memory 10 begins with a first operation controlled by the processor 22 (FIG. 3) for the writing selection of the circuit 165 by means of a high logic level of the signal RD (see also FIG. 5) and a low level of the signals $\overline{WR}$ and 174 at the input of the circuit 165. Immediately afterwards, the signals $A_0$ and $A_1$ are brought by the processor 22 to the levels "0, 1" so as to select, as indicated in the last line of FIG. 5, the gate C of the circuit 165. At the same time, the processor 22 generates over the data channel 159 a command word 200 which is latched in the gate C and has the effect of enabling the signals 373 and 374 pertaining to the bus 173. The signals 373 and 374 respectively generate a high logic level at the CS pin of the EPROM 10, and a voltage of 25 V, obtained in the described manner, at the VPP pin. The memory 10 thus becomes selected for a programming operation (operation 80 in FIG. 4). The processor 22 then feeds over the data bus 159 a command word 201 (FIG. 5) which, accompanied by a "1, 0" configuration of the signals $A_0$, $A_1$, is latched in the gate B of the circuit 165 with the effect of enabling the signal EN 166 pertaining to the bus 172.

A word 202, then generated by the processor 22 over the bus 159, represents the most significant part of the selected address. It is accompanied by the levels $A_0$, $A_1$ which select the gate A, so that the word 202 is immediately latched by way of the channel 171 in the register 166 (FIG. 3), which had been previously enabled and of which the output, over bus 175, is represented in FIG. 5.

A word 203 addressed to the gate B then enables the register 167 by means of a signal EN 167, and the less significant part 204 of the selected address is stored by the procedure just described, firstly in the gate B then in the register 167.

At this point, the channel 175 presents the complete address 202+204 at the input to the memory 10 of FIG. 3. Initially, this address is X=1, and the relative operation is indicated by block 81 in FIG. 4B. By means of an analogous procedure, the processor 22 enables the register 168 by means of a word 205 (FIG. 5) (command EN 168), and causes the storing in this register of word 206 is obviously taken from the previously programmed working memory 24. It follows that the data item 206 is also located at the input to the memory 10 by way of the bus 176.

At this point, the process 22 generates a command word 207 addressed to the gate C of the circuit 165 (configuration "0, 1" of the signals $A_0$, $A_1$). The word 207 enables the input signal 375 to the PD/PGM pin, which times the programming on the memory 10, of the data item over bus 176 at the address presented over bus 175.

At this point, the operation of programming the memory 10 by means of the data item 206 at the address 202+204 has been carried out (operation 82 in FIG. 4), and a checking operation follows consisting of re-reading the data item 206 which has just been recorded. The processor 22 now stores a further command word 208 in the gate C of the circuit 165, which brings all three signals 373, 374 and 375 (FIG. 3) of channel 173 to low logic level, to enable the memory 10 for a reading operation.

The addressed word generated over channel 176 is the same as the data item 206 which has just been programmed, because the same address 202+204 (FIG. 4) remains over bus 175 which addresses the memory 10. At the same time and in the usual manner a word 209 enables the command EN 169 for enabling the register 169 (FIG. 3). Consequently, the word 206 is stored in the register 169 and fed over bus 171 as can be seen in FIG. 5. With the switching-over of both the signals $\overline{RD}$ and $\overline{WR}$ and the selection of levels "0, 0" of the signals $A_0$ and $A_1$, the processor 22 now causes reading at the imput of gate A (operation 83 in FIG. 4) of the data item 206 present by way of the bus 171. Having read the data item, the processor 22 then makes a vertification test 84 consisting of an operation in which the data item re-read by the EPROM 10 is compared with the corresponding data item IX taken from the memory 24.

If this verification is positive, after a word 210 (FIG. 5) necessary for disabling the signal EN 169, the processor 22 again generates the words 200 and 201 in order to prepare the circuit 26 for programming the next data item on the memory 10, and the same operations as heretofore described are then repeated. In particular, if the comparison 84 of FIG. 4 gives a positive result, this group of operations is repeated by incrementing the address X (block 86). If however the comparison 84 gives a negative result, the process 22 passes an "ERROR" code to the interface 25 (block 87). When the central processor 1 examines the interface 25, it takes the error signal by means of the reading operation 88, and prints it in plain language (block 89) by means of the printer 12 (FIG. 1). In this manner the operator is always informed of a programming error of the EPROM memory 10.

If no error signal is printed, the operations 82-88 are repeated until a positive result of the selection 85 indicates that transfer of the last data item has been made. At this point the proposed result has been attained, in that the new EPROM memory 10 is available, programmed as the old EPROM memory 5 but with the required modifications made. The EPROM 5 can be removed from its socket and be replaced by the new EPROM 10.

With reference to FIG. 6, a description will now be given of the sequence of operations controlled by the operator by means of a command known as "CONTROL R" typed on the keyboard 6 in order to determine reading and total printing of the EPROM 10. Printing the entire contents of the EPROM 10 enables a complete check to be made of it, and it is useful in particular in order to check if a memory is programmable, i.e. is not already recorded because of which all the read data are at logic level 1.

The type of conversation between the central processor 1 and secondary processor 22 is entirely similar to that described with reference to FIG. 4. When the operator types the codes "CONTROL R" (block 300), the secondary processor 22 interprets them as a total reading command 301 for the EPROM 10.

The secondary processor 22 then executes the reading of the first data item IX at the address X=1 (blocks 302 and 303) of the EPROM memory 10 in the same manner as described with reference to the diagrams of FIG. 5. By means of operation 304, the processor 22 memorises the data item IX just read on the interface 25, which is read at the due time by the central processor 1 (operation 305) and printed (operation 306).

These operations are repeated starting from block 303 incrementing the address (block 307) each time, until the selection 308 indicates that the entire EPROM memory 10 has been read and printed.

It is apparent that various modifications and improvements can be made to the described apparatus without leaving the scope of the invention as claimed. For example, the circuit 9 can be connected to the apparatus 13 by operating a manual control, or by directly connecting the connector 8 to the apparatus 13. The presence of the plate 21 can be sensed by means of a routine activated at each initialisation of the apparatus, instead of by the contact 30. In addition, the selection of the data item to be modified on the new EPROM 10 can be made by means of a single addressing operation following the CONTROL command, and the data can be checked by a display instead of by means of the printer 12.

Although a special programming socket 11 has been described for the new EPROM it would be possible to modify data paths so that the old EPROM 5 would be read into RAM, and removed from its socket to be replaced by the new EPROM 10. After updating the data in RAM, this would be written into the new EPROM.

We claim:

1. An electronic teleprinting apparatus including a removable programmed EPROM and comprising a central processor, a keyboard for entering commands and data for said processor, and a printer controlled by said processor for printing telegraphic messages, said programmed EPROM being recorded with operating routines for said processor, as well as with telegraphic indentification data, wherein the improvement comprises an EPROM programming circuit included in the apparatus and conditionable for programming a fresh EPROM, connecting means adapted to be rendered effective for connecting said fresh EPROM to said programming circuit and for so conditioning said programming circuit, said programming circuit including means controlled by said processor for reading data from said programmed EPROM and for selectively supplementing and selectively modifying the data so read in combination with said data entered from said keyboard in accordance to said commands and data entered from said keyboard, said processor including control means for conditioning said printer to print the data read from said programmed EPROM and the data so supplemented and modified for checking purpose, and command means operable for conditioning said programming circuit to permanently record said supplemented and modified data on said fresh EPROM, whereby the programmed EPROM can be functionally replaced by the fresh EPROM so recorded, and thus may be removed.

2. An apparatus as claimed in claim 1, wherein said operating routines recorded in said programmed EPROM include a routine for initializing the apparatus, said connecting means conditioning said programming circuit upon switching on the apparatus and causing said processor to be controlled by said initializing routines.

3. An apparatus as claimed in claim 1, wherein said identification data recorded in said programmed EPROM include teleprinting answer back data, teleprinting connection and line data, data for decoding character sequences and editing data for printing messages, said processor controlling said programming circuit to selectively supplement and modify said data according to said data entered from the keyboard.

4. An apparatus according to claim 1, wherein said programming circuit comprises an auxiliary processor controlled by said central processor in a master-slave relationship, and a working memory for storing the data read from said programmed EPROM and for supplementing and modifying them with the data entered from said keyboard.

5. An apparatus according to claim 4, wherein said keyboard includes a plurality of keys for generating selection commands for selecting predetermined data stored in said working memory, said central processor including means for communicating the selection commands so generated and said data entered from the keyboard to said auxiliary processor for modifying the selected data in said working memory.

6. Apparatus as claimed in claim 5, wherein the programming circuit comprises transfer means controlled by the selection commands said auxiliary processor to transfer the data stored in said processor, the transfer means being further controlled by said auxiliary processor to transfer the data stored in said working memory to the central processor for causing said printer to print the data stored in said working memory.

7. Apparatus as claimed in claim 4, further comprising checking means activated by said second processor each time said recording means have recorded said fresh EPROM with an item of data contained in the working memory, the checking means comprising means for reading the recorded items, means for comparing the recorded data items with the data item stored in the working memory, and means for indicating an error if the comparison is negative.

8. Apparatus as claimed in claim 7, comprising manual control means for causing the reading means to read each data item contained in the recorded fresh EPROM and to transfer it to the central processor for controlling said printer to print contents of the recorded fresh EPROM.

9. Apparatus as claimed in claim 6, comprising means responsive to the selection commands generated by said keys and the supplementing and modifying data entered from the keyboard activate a selection command for causing the transfer means to temporarily memorize the said selection command and data and for producing an interrupt signal which conditions the auxiliary processor to process said selection command and data.

10. Apparatus as claimed in claim 9, wherein the transfer means comprise means for storing data generated by the auxiliary processor, the central processor periodically examining said storing means for processing the data stored therein.

* * * * *